(12) United States Patent
Kalka et al.

(10) Patent No.: US 11,982,299 B2
(45) Date of Patent: May 14, 2024

(54) DEVICE AND USE FOR FASTENING A SANITARY COMPONENT TO A WALL

(71) Applicant: Grohe AG, Hemer (DE)

(72) Inventors: Franziska Kalka, Soest (DE); Hendrik Heitkamp, Dortmund (DE); Anja Rützler, Menden (DE)

(73) Assignee: GROHE AG, Hemer (DE)

( * ) Notice: Subject to any disclaimer, the term of this patent is extended or adjusted under 35 U.S.C. 154(b) by 38 days.

(21) Appl. No.: 17/903,346

(22) Filed: Sep. 6, 2022

(65) Prior Publication Data
US 2023/0071342 A1    Mar. 9, 2023

(30) Foreign Application Priority Data
Sep. 6, 2021  (DE) .......................... 102021122981.2

(51) Int. Cl.
*F16B 11/00*    (2006.01)
*F16B 9/00*    (2006.01)
*F16M 13/02*    (2006.01)

(52) U.S. Cl.
CPC ........... *F16B 11/006* (2013.01); *F16M 13/02* (2013.01); *F16B 9/052* (2018.08)

(58) Field of Classification Search
CPC .. F16B 11/006; F16B 9/052; B29C 66/72321; F16M 13/02
USPC .............................................. 248/683, 205.3
See application file for complete search history.

(56) References Cited

U.S. PATENT DOCUMENTS

2010/0230565 A1    9/2010  Walsh

FOREIGN PATENT DOCUMENTS

DE         102006000601 A1 *  7/2007  ............ F16B 11/006
DE         10 2016 006 054    11/2016

\* cited by examiner

*Primary Examiner* — Carson Gross
(74) *Attorney, Agent, or Firm* — Wenderoth, Lind & Ponack, L.L.P.

(57) ABSTRACT

A device (1) for mounting a sanitary component to a support, comprising at least:
 a mounting plate (2) having an adherend (3) for attaching the device (1) to the support; and
 a metal mesh (4), at least partially forming the adherend (3); and the use of the device.

12 Claims, 2 Drawing Sheets

DEVICE AND USE FOR FASTENING A SANITARY COMPONENT TO A WALL

This invention relates to a device and use of the device for mounting a sanitary component to a support, such as a wall. Such devices can be used in particular to mount sanitary components, such as shower rods, towel rails, shelves and/or soap dispensers, to walls of sanitary rooms.

Known devices for mounting sanitary components are regularly mounted to a wall using screws. A known issue are tiled walls in sanitary rooms, which tiles can be damaged by the screw connections. Furthermore, the attachment of mounting devices using adhesive strips or glue is known, which can prevent damage to tiles. The disadvantage thereof is, however, that the bonding often does not achieve the required durability.

Therefore, the invention addresses the problem of solving at least a part of the issues described with reference to the prior art and, in particular, of providing a device for mounting a sanitary component to a wall, achieving a high degree of durability in so doing.

This problem is solved by a device according to the features of the independent claim. Further advantageous embodiments of the device are specified in the dependent claims. It will be appreciated that the features listed individually in the dependent claims may be combined in any technologically useful manner and define further embodiments of the invention. In addition, the features indicated in the claims are further specified and explained in the description, wherein further preferred embodiments of the invention are illustrated.

A device for mounting a sanitary component to a support, comprising at least the following, contributes to solving the problem:
 a mounting plate having an adherend for attaching the device to the support; and
 a metal mesh, at least partially forming the adherend.

In particular, the device is used to attach a sanitary component to a support, such as a wall, a ceiling and/or a bracket to be mounted there. Such a sanitary component may be, for instance, a shower bar, towel holder, soap dispenser, shelf, paper holder, toilet brush set, etc. The device may be a separate component or assembly, to which the sanitary component can be attached. Furthermore, the device can also be formed integrally with the sanitary component.

The device has a mounting plate, which can be designed, for instance, in the manner of a mounting bracket. Furthermore, the mounting plate may have a (roughly) circular cross-section, in particular orthogonal to a center axis or longitudinal axis of the mounting plate. In addition, the mounting plate may have a diameter of, for instance, 10 mm to 100 mm, particularly orthogonal to the center axis or longitudinal axis, and/or a thickness of 2 mm to 30 mm, particularly in parallel to the center axis or longitudinal axis.

The mounting plate has an adherend for attaching the device to the wall. The adherend is in particular a surface of the mounting plate, to which an adhesive can be applied for attaching the device to the support or wall. Thus, the adherend may, in particular, be a non-self-adhesive surface. The adhesive can be, for instance, a one-component adhesive, two-component adhesive or multi-component adhesive. In particular, the adhesive can be applied to the adherend before the mounting plate is pressed against the support. Alternatively, the adhesive can also be injected into a gap and/or onto the adherend via a feed opening in the mounting plate. In particular, the adherend extends orthogonally to the center axis or longitudinal axis of the mounting plate. Furthermore, the adherend can be round and/or have a bonding surface diameter of, for instance, 9 mm to 99 mm [millimeters]. The application of the adhesive is usually performed just before the mounting plate is mounted on the support or wall, i.e., usually it is not part of the device itself.

The device also includes a metal mesh that at least partially forms the adherend. The metal mesh can at least partially be made of stainless steel or a zinc alloy. The metal mesh has particularly advantageous adhesive properties for the adhesive. Furthermore, the metal mesh can be designed in the manner of a wire gauze. The wire mesh may be a mesh and/or a sheet-like structure having a plurality of openings. The openings can be of the same type and/or arranged in a regular pattern. Furthermore, the openings can be formed by crossing warp wires and weft wires of the wire mesh, in particular at right angles.

The mounting plate can be at least partially made of plastic. It is possible for the mounting plate to consist entirely of plastic. Furthermore, the mounting plate may be a plastic injection-molded part. This makes for a high degree of design freedom for the mounting plate at low cost. Alternatively, the mounting plate can also be at least partially made of a metal, such as stainless steel.

The metal mesh can be at least partially integrated or cast into the mounting plate. For this purpose, the metal mesh can be inserted into an injection mold during the manufacture of the mounting plate, for instance, and liquid plastic can then be injected into the injection mold such that the metal mesh is at least partially molded into the mounting plate after the plastic has cured.

The mounting plate may include a first plate part and a second plate part, between which the metal mesh is at least partially disposed. The first plate part and the second plate part can be disposed adjacently, in particular in the direction of the center axis or the longitudinal axis. The metal mesh can be at least partially clamped between the first plate part and the second plate part, such that the metal mesh is attached, in particular frictionally, to the mounting plate. The first plate part and/or the second plate part may in particular be at least partially made of a plastic and/or a metal, such as noble metal.

The adherend can be at least partially ventilatable via the metal mesh. For this purpose, the metal mesh can have at least one exposed area, where air can flow from a front end of the device through the openings of the metal mesh to the adherend. For this purpose, the mounting plate may have at least one breather hole extending, in particular completely, through the mounting plate in parallel to the center axis or the longitudinal axis, "Exposed" shall be understood to denote in particular that the metal mesh does not contact the mounting plate on either side in the at least one exposed area or does not rest against the mounting plate. The adhesive can flow through the openings of the metal mesh during application in the at least one exposed area, such that the metal mesh is embedded in the adhesive in the at least one exposed area. The adhesive and the metal mesh can form a composite material in so doing. A cross-section area of the at least one breather hole or a sum of cross-sectional areas of all vent openings of the mounting plate may be, for instance, 100 $mm^2$ (square millimeters) to 1,000 $mm^2$. Further, the at least one breather hole may extend, for instance, across an area of 20% to 100% of the adherend. In other words, this can also mean that, for instance, 30% to 80% of a total area of the adherend is formed by the at least one exposed area of the metal mesh.

The mounting plate may have a receiving space for an adhesive. The receiving space can, for instance, be designed in the manner of a depression in the end face of the mounting plate. The receiving space is at least partially, possibly even completely, delimited by the metal mesh and/or the adherend. To form the receiving space, the adherend can be formed, in particular in parallel to the center axis or the longitudinal axis, in the mounting plate at a depth of 0.3 mm to 5 mm (millimeters) starting from the end face of the mounting plate. In particular, the receiving space can form a gap between the adherend and the support when the device is mounted to the support.

The mounting plate can have at least one contact surface for the support, which contact surface can be used to space the adherend apart from the support. The contact surface is in particular a surface of the mounting plate that contacts the support after the mounting plate has been mounted. In particular, the contact surface is designed in such a way that a gap or the receiving space for the adhesive is formed between the adherend and the wall. The adherend can be formed in the mounting plate, in particular in parallel to the center axis or the longitudinal axis of the mounting plate, for instance at a distance of 0.3 mm to 5 mm (millimeters) from the contact surface. This can be used to establish a gap having a gap width of 0.3 mm to 5 mm between the adherend and the support. Furthermore, the adherend and the contact surface can extend in parallel to each other. In addition, the contact surface can be annular. The contact surface may include at least one adhesive for pre-attaching the device to the support. The at least one adhesive may be, for instance, an adhesive sheet that secures the mounting plate to the support before the adhesive has cured. Furthermore, the adhesive film can be circumferential, annular, ring segment-shaped, rectangular and/or point-shaped.

The metal mesh may comprise a plurality of openings having a width of 0.1 mm to 1 mm (millimeters). The width can also be a diameter or a mesh size of the openings of the metal mesh.

The mounting plate may have at least one first mounting device for attaching the mounting plate to the support. The at least one mounting device can, for instance, be designed in the manner of a mounting opening and/or drilled hole. Further, the at least one first mounting device may extend in parallel to the center axis or the longitudinal axis through the mounting plate. The mounting plate in particular can be mounted to the support via the at least one first mounting device, for instance using a screw and/or a dowel. This can further increase the durability of the mounting plate on the support.

The mounting plate may have at least one second mounting device for the sanitary component. The at least one second mounting device may, for instance, be designed in the manner of a drilled hole, recess, interface, thread, bayonet catch, latching hook, and/or latching geometry. The at least one second mounting device can be used in particular to mount the sanitary component to the mounting plate or the device.

According to a further aspect, the use of a device disclosed herein for securely and/or easily mounting a sanitary component to a support (without damaging the support) by means of an adhesive is proposed. The explanations relating to the device and its usage can also be used to characterize its use.

The invention and the technical environment are explained in more detail below with reference to the figures. It should be noted that the figures show particularly preferred variants of the embodiment of the invention, but the invention is not limited thereto. The same reference numerals are used for the same components in the figures. Schematically:

Figure 1:
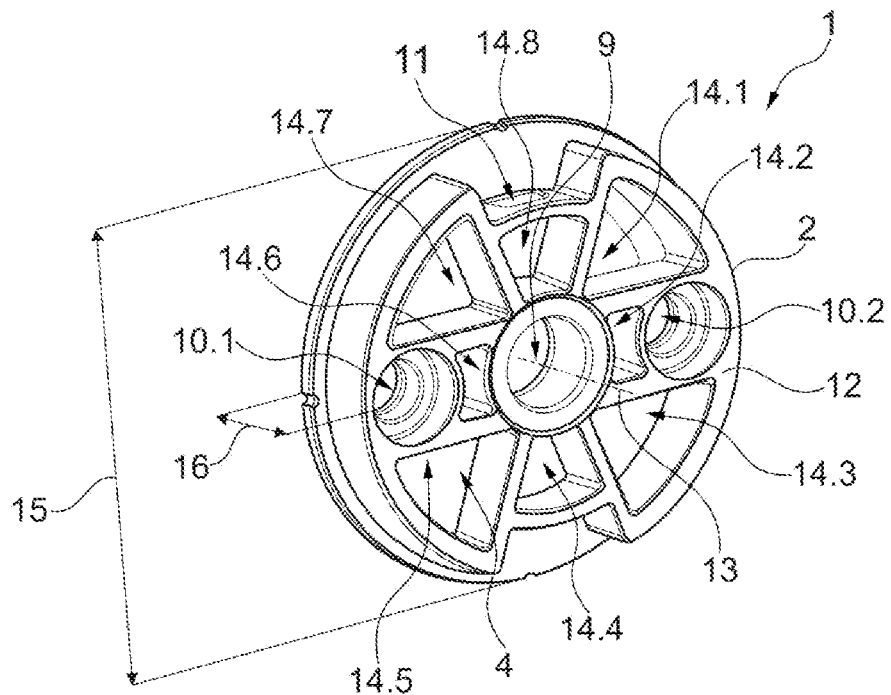
FIG. 1 shows a first perspective representation of a first embodiment variant of a device.
Figure 2:
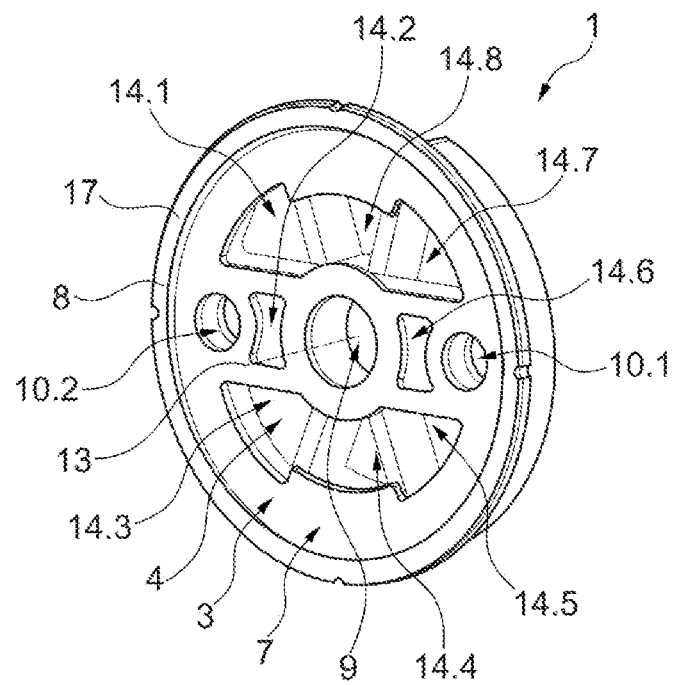
FIG. 2 shows a second perspective representation of the second embodiment variant of a device.

FIG. 1 shows a first perspective representation of a first embodiment variant of a device 1 viewed towards a front end 12. The device 1 comprises a mounting plate 2, which is designed in the manner of a mounting disk. The mounting plate 2 is round in shape and extends along a longitudinal axis 13. Furthermore, the mounting plate 2 is designed as an integrally formed plastic injection molded part. The device 1 or mounting plate 2 has (orthogonal to the longitudinal axis 13) a diameter 15 and (in parallel to the longitudinal axis 13) a thickness 16. Furthermore, the device 1 comprises a metal mesh 4, which is cast into the mounting plate 2 except in the area of the breather holes 14.1, . . . , 14.8. The metal mesh 4 is of the wire mesh type and extends in a plane oriented orthogonally to the longitudinal axis 12. FIG. 2 shows the first embodiment variant of the device 1 in a second perspective representation viewed towards a contact surface 8, which extends annularly around the longitudinal axis 13 of the device 1. When the device 1 is attached to a support not shown here, the contact surface 8 of the device 1 is positioned at the support. The contact surface 8 is formed on an end face 17 of the device 1 or of the mounting plate 2 and may have an adhesive, for instance in the form of a double-sided adhesive tape, for pre-attaching the device 1 to the support. Furthermore, the mounting plate 2 has an adherend 3, which is partially formed by the metal mesh 4. The adherend 3 extends within the annular contact surface 8 and (mainly) orthogonally to the longitudinal axis 13, Furthermore, the adherend 3 is formed within the mounting plate 2 such that the adherend 3 (in parallel to the longitudinal axis 13) is spaced apart from the contact surface 8. As a result, the adherend 3 is not in contact with the support when the contact surface 8 of the device 1 is disposed on the support. Starting from the contact surface 8 or the end face 17, the adherend 3 is formed at a depth (extending in parallel to the longitudinal axis 13) of the mounting plate 2. The adherend 3 delimits a receiving space 7 for an adhesive (not shown here), wherein the receiving space 7 extends in a cylindrical shape from the adherend 3 in parallel to the longitudinal axis 13 to the contact surface 8. After arranging the contact surface 8 of the device 1 on the support, an adhesive can be injected into the receiving space 7 via a feed opening 9 (also shown in FIG. 1), which extends in parallel and coaxially to the longitudinal axis 13. Because the adherend 3 or the receiving space 7 can be ventilated via the breather holes 14.1, . . . 14.8, the adhesive can cure particularly quickly. In addition, the adhesive can flow from the receiving space 7 through the metal mesh 4 towards the front end 12 shown in FIG. 1, such that the adhesive can form a composite material with the metal grid 4. In addition, the mounting plate 2 has two first mounting devices 10.1, 10.2, which are designed in the manner of drilled holes extending in parallel to the longitudinal axis 13. The mounting devices 10.1, 10.2 can be used to additionally mount the device 1 to the support using screws. In addition, the mounting plate 2 has two second mounting devices 11, one of which is visible in FIG. 1. The two second mounting devices 11 are designed in the manner of snap-in contours, to which a sanitary component (not shown here) can be fastened.

Figure 3:
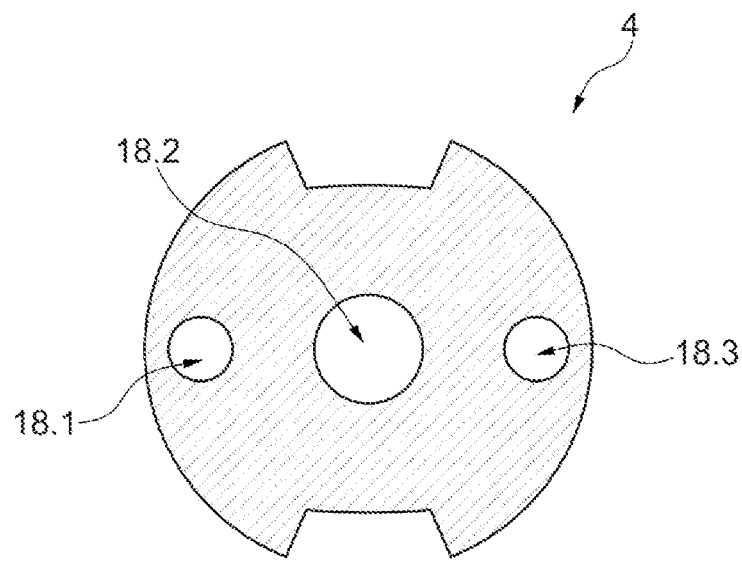
FIG. 3 shows a metal mesh of the first embodiment variant of the device.

FIG. 3 shows a front view of the metal mesh 4 of the device 1 of FIGS. 1 and 2. The metal mesh 4 has cutouts 18.1, 18.2, 18.3 for the first mounting devices 10.1, 10.2 and the feed opening 9 shown in FIGS. 1 and 2.

Figure 4:
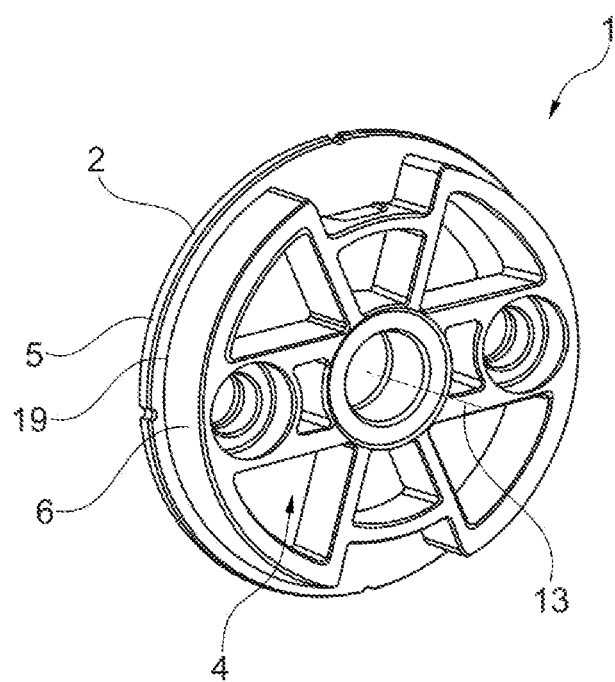
FIG. 4 shows a second embodiment variant of a device.

FIG. 4 shows a perspective representation of a second embodiment variant of the device 1. The second embodiment variant of the device 1 differs from the first embodiment variant of the device 1 shown in FIGS. 1 and 2 only in that the mounting plate 2 comprises a first (mainly) round plate part 5 and a second (mainly) round plate part 6. The first plate part 5 and the second plate part 6 are arranged side by side in the direction of the longitudinal axis 13 and contact each other in a contact plane 19. Furthermore, the first plate part 5 and the second plate part 6 are interconnected using a snap connection, such that the metal mesh 4 is clamped between the first plate part 5 and the second plate part 6 of the mounting plate 2. In all other respects, the second embodiment variant of the device 1 is configured identically to the first embodiment variant of the device 1 shown in FIGS. 1 and 2, such that reference is made to the description of the first embodiment variant of the device 1 for further details.

The device is characterized in particular by high durability at the support.

LIST OF REFERENCE NUMERALS 1 device
2 mounting plate
3 adherend
4 metal mesh
5 first plate part
6 second plate part
7 receiving space
8 contact surface
9 feed opening
10.1, 10.2 first mounting device
11 second mounting device
12 Front end
13 longitudinal axis
14.1, . . . , 14.8 breather hole
15 diameter
16 thickness
17 end face
18.1, 18.2, 18.3 cutout
19 contact plane

The invention claimed is:

1. A device (1) for mounting a sanitary component to a support, comprising:

a mounting plate (2) comprising a contact surface (8), a receiving space (7), a feed opening (9), and an adherend (3); and a metal mesh (4), at least partially forming the adherend (3), wherein the contact surface (8) spaces the adhered (3) apart from the support, and the feed opening (9) extends in parallel to a longitudinal axis (13) of the mounting plate (2).

2. The device (1) according to claim 1, wherein the mounting plate (2) is at least partially made of a plastic.

3. The device (1) according to claim 1, wherein the metal mesh (4) is at least partially integrated in the mounting plate (2).

4. The device (1) according to claim 1, wherein the mounting plate (2) further comprises a first plate part (5) and a second plate part (6), wherein the metal mesh (4) is at least partially disposed between the first plate part (5) and the second plate part (6).

5. The device (1) according to claim 1, wherein the adherend (3) is at least partially ventilatable via the metal mesh (4).

6. The device (1) according to claim 1, wherein the metal mesh (4) comprises a plurality of openings (9) having a width of 0.1 mm to 1 mm.

7. The device (1) according to claim 1, wherein the mounting plate (2) further comprises at least one first mounting device (10.1, 10.2) for attaching the mounting plate (2) to the support, wherein the at least one first mounting device (10.1, 10.2) is a hole or an opening in the circular mounting plate (2).

8. The device (1) according to claim 1, wherein the mounting plate (2) further comprises at least one second mounting device (11) for the sanitary component, wherein the at least one second mounting device (11) is selected from the group consisting of a hole, a recess, an interface, a thread, a bayonet catch, a latching hook and a latching geometry.

9. The device (1) according to claim 1, wherein the mounting plate (2) further comprises at least one breather hole.

10. The device (1) according to claim 9, comprising a plurality of breather holes having different shapes.

11. The device (1) according to claim 1, wherein the feed opening (9) is in a center of the mounting plate (2).

12. A method for attaching a sanitary component to a support, comprising:

attaching a device (1) according to claim 1 to a support, and attaching a sanitary component to the device (1).

\* \* \* \* \*